(12) United States Patent
Takahashi

(10) Patent No.: US 7,564,743 B2
(45) Date of Patent: Jul. 21, 2009

(54) OPTICAL DISC APPARATUS

(75) Inventor: Ryuji Takahashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 490 days.

(21) Appl. No.: 11/474,962

(22) Filed: Jun. 27, 2006

(65) Prior Publication Data

US 2006/0291341 A1   Dec. 28, 2006

(30) Foreign Application Priority Data

Jun. 27, 2005   (JP)   ............... 2005-186831

(51) Int. Cl.
*G11B 17/00* (2006.01)
(52) U.S. Cl. ................... 369/30.36; 369/53.22
(58) Field of Classification Search ............. 369/30.32, 369/77.11, 52.2, 53.41; 720/606, 619, 629, 720/631, 645; 386/125, 126
See application file for complete search history.

(56) References Cited

U.S. PATENT DOCUMENTS 4,796,100 A * 1/1989 Sakaguchi .............. 386/105
6,515,951 B1 * 2/2003 Oh ........................ 369/53.37
7,085,212 B2 * 8/2006 Choi et al. ............... 369/53.2
2004/0254676 A1 * 12/2004 Blust et al. ............... 700/231
2007/0133361 A1 * 6/2007 Takahashi ............... 369/30.27

FOREIGN PATENT DOCUMENTS

JP    2003-016769    1/2003

* cited by examiner

*Primary Examiner*—Wayne R Young
*Assistant Examiner*—Brian Butcher
(74) *Attorney, Agent, or Firm*—Pillsbury Winthrop Shaw Pittman, LLP

(57) ABSTRACT

An optical disc apparatus is adapted to load an optical disc inserted in a slot into a main body and to read and reproduce data stored on the optical disc. The optical disc apparatus temporarily prevents a loading means from loading an optical disc into the main body if a guide flag stored in a storage means is off when the optical disc is inserted in the slot. At the same time, the apparatus instructs a guide image outputting means to output a guide image that indicates a proper orientation in which the optical disc is to be inserted into the slot.

4 Claims, 4 Drawing Sheets

OPTICAL DISC APPARATUS

CROSS REFERENCE

This Nonprovisional application claims priority under 35 U.S.C. § 119(a) on Patent Application No. 2005-186831 filed in Japan on Jun. 27, 2005, the entire contents of which are hereby incorporated by reference.

BACKGROUND OF THE INVENTION

The invention relates to slot-loading optical disc apparatus adapted to hold an optical disc, such as a CD or DVD, inserted in a slot and to deliver the disc to a set position where the disc is mounted on a turntable.

Conventional optical disc apparatus are adapted to read data of contents recorded on an optical disc and to reproduce an image or a sound based on the read data, i.e., reproduce the contents. It is known that optical disc apparatus read data stored on an optical disc by irradiating the disc that is mounted on a turntable and being spun with a laser beam and detecting the reflected light. Such conventional optical disc apparatus are roughly classified into two categories: a tray-loading type and a slot-loading type. A tray-loading optical disc apparatus has a movable tray for delivering an optical disc to a set position where the disc is mounted on a turntable. A slot-loading optical disc apparatus is adapted to hold an optical disc inserted in a slot and deliver the disc to a set position.

Proposed in JP 2003-016769A is a tray-loading optical disc apparatus having a tray with a disc mounting area rendered recognizable under low light conditions. More specifically, luminous material is applied to the disc mounting area so as to glow when irradiated with light emitted from a light source. Because of the luminous material, the proposed apparatus allows a user to recognize the disc mounting area and an optical disc mounted on the tray, thereby facilitating mounting and removal of the optical disc on and from the tray.

In contrast, slot-loading optical disc apparatus have the problem that an optical disc is often inserted in reverse orientation thereinto. Specifically, various slot-loading optical disc apparatus have slots that are variously oriented (e.g., horizontally and vertically) and provided in various positions (e.g., on a front, side, or top surface). Also, an optical disc is inserted in different orientations into the slot, depending on different optical disc apparatus. These variations often mislead a user into inserting an optical disc in reverse orientation.

To solve the foregoing problem, a slot-loading optical disc apparatus has been proposed in which a sticker is placed, or a marking is provided, around a slot to indicate a proper orientation in which an optical disc is to be inserted, i.e., an orientation of a recorded surface of the disc, so that a user can verify the proper orientation. However, many users insert an optical disc into the slot without recognizing the sticker or marking. Also, some users do not understand the meaning of symbols in the sticker or marking that indicate the orientation of optical disc. Thus, the proposed apparatus has not fully prevented reverse insertion.

Furthermore, the proposed apparatus requires a user to take a sequence of steps of ejecting an optical disc inserted in reverse orientation, bringing the disc in proper orientation, and then inserting the disc again. Many users feel that this sequence is troublesome and degrades the usability of the apparatus.

In light of the foregoing, a feature of the invention is to provide a slot-loading optical disc apparatus that allows a user to recognize a proper orientation of an optical disc, thereby preventing insertion of an optical disc in reverse orientation.

SUMMARY OF THE INVENTION

According to an aspect of the invention, an optical disc apparatus includes a loading means and a reproducing means. The loading means loads an optical disc inserted in a slot into a main body. The reproducing means reads and reproduces data stored on the optical disc. The optical disc apparatus also includes a guide image outputting means, a determining means, a storage means, and a verification requesting means. The guide image outputting means outputs a guide image that indicates a proper orientation in which an optical disc is to be inserted into the slot. The determining means determines, when the loading means loads an optical disc inserted in the slot into the main body, whether the optical disc is in proper orientation or in reverse orientation. The storage means stores therein a guide flag. The guide flag is turned on when number of reverse insertions determined by the determining means satisfies a first condition. The guide flag is turned off when number of proper insertions determined by the determining means satisfies a second condition. If the guide flag is on when an optical disc is inserted in the slot, the verification requesting means instructs the guide image outputting means to output the guide image, while temporarily preventing the loading means from loading the optical disc into the main body.

As described above, the guide flag is turned on when the number of reverse insertions determined by the determining means satisfies the first condition, whereas the guide flag is turned off when the number of proper insertions determined by the determining means satisfies the second condition. The first condition is preferably set in such a manner as to be associated with a high likelihood of reverse insertion. For example, the guide flag is turned on when there are three reverse insertions, out of ten recent disc insertions, determined by the determining means. On the other hand, the second condition is preferably set in such a manner as to be associated with a low likelihood of reverse insertion. For example, the guide flag is turned off when there are a predetermined number (e.g., three or five) of successive proper insertions determined by the determining means.

It is to be noted that the guide flag is held in existing state if both of the first and second conditions are not satisfied.

If the guide flag is on when an optical disc is inserted in the slot, i.e., when there is a high likelihood of reverse insertion, the verification requesting means instructs the guide image outputting means to output the guide image, while temporarily preventing the loading means from loading the optical disc into the main body. The foregoing configuration allows a user to check whether an optical disc is inserted in proper orientation in the slot before the disc is loaded into the main body and, if the disc is inserted in reverse orientation, to bring the disc in proper orientation immediately. The configuration thus prevents reverse insertion and enhances usability of the optical disc apparatus.

In addition, if the guide flag is off when an optical disc is inserted in the slot, i.e., when there is a low likelihood of reverse insertion, the verification requesting means allows the loading means to load the optical disc into the main body, without instructing the guide image outputting means to output the guide image. The configuration prevents a user that is aware of the proper orientation of optical disc from checking whether an optical disc is inserted in proper orientation or in reverse orientation, thereby saving the user from feeling inconvenience.

According to another aspect of the invention, the verification requesting means, after instructing the guide image outputting means to output the guide image, allows the loading means to load an optical disc inserted the slot into the main body, upon receipt of an input for verifying that the optical disc is inserted in proper orientation. This configuration prevents the loading section from loading an optical disc inserted in reverse orientation in the slot into the main body.

According to another aspect of the invention, the verification requesting means instructs the guide image outputting means to output the guide image when the determining means determines that an optical disc loaded in the main body is in reverse orientation. The configuration allows a user immediately to recognize the proper orientation of optical disc when the user inserts an optical disc in reverse orientation in the slot.

According to another aspect of the invention, the verification requesting means instructs the guide image outputting means to output the guide image at a predetermined time regardless of whether the guide flag is on or off. This configuration allows a user to recognize the proper orientation of optical disc at a proper timing.

DETAILED DESCRIPTION OF THE INVENTION

Figure 1:
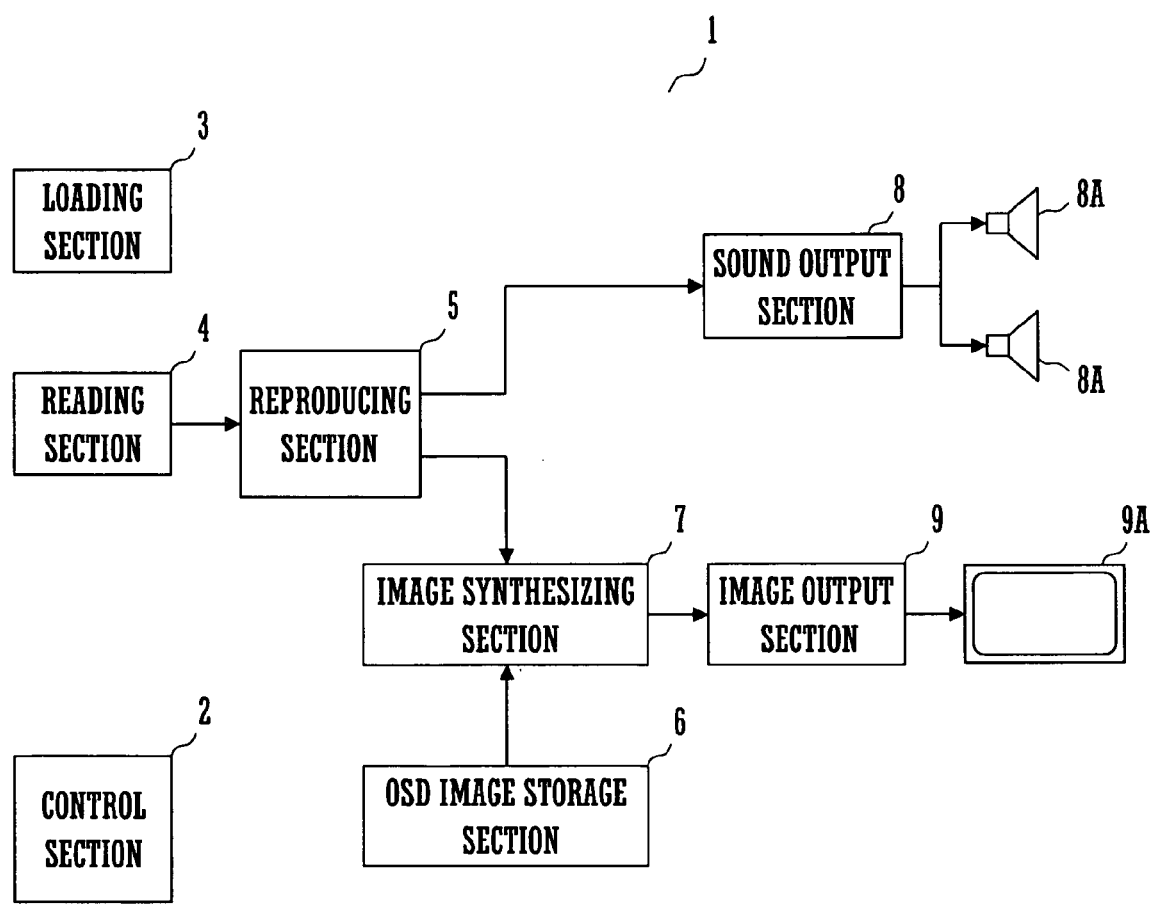
FIG. 1 is a block diagram illustrating a configuration of relevant components of an optical disc apparatus according to an embodiment of the invention.
Figure 2:
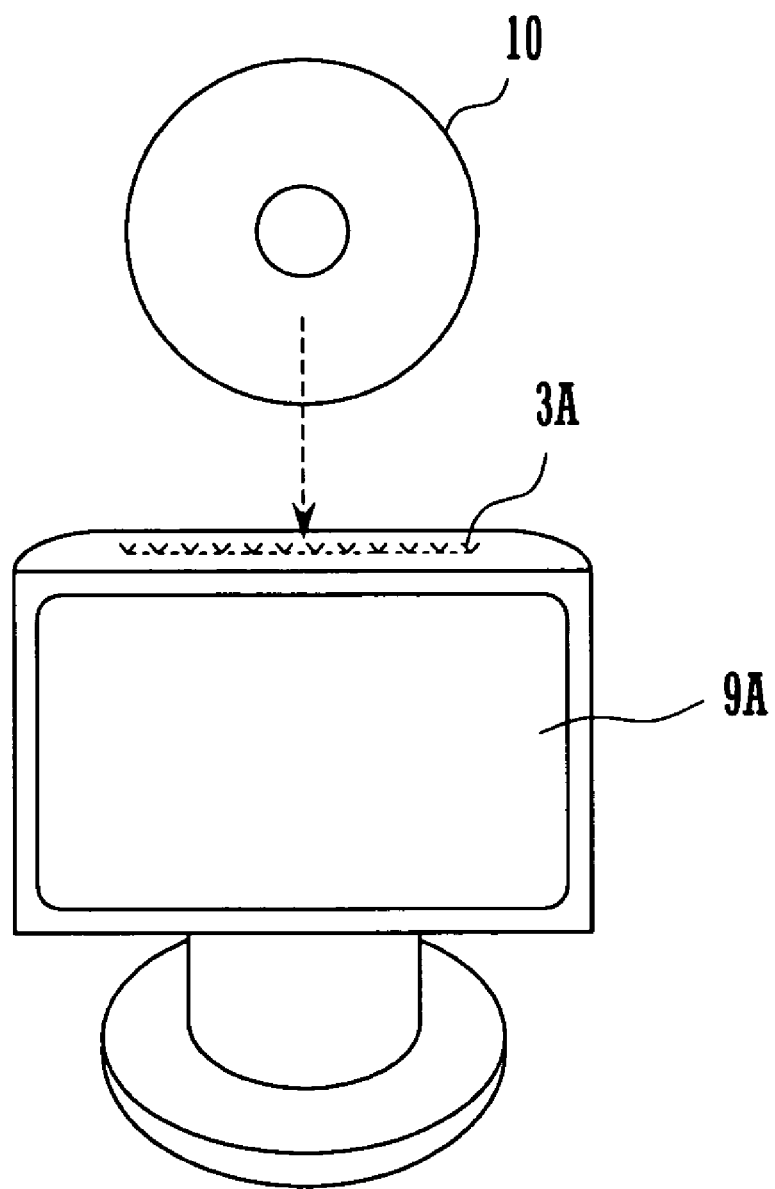
FIG. 2 is a schematic external view of the apparatus.

FIG. 1 is a block diagram illustrating a configuration of relevant components of an optical disc apparatus according to an embodiment of the invention. FIG. 2 is a schematic external view of the apparatus. Referring to FIG. 1, an optical disc apparatus such as an apparatus 1 includes a control section 2, a loading section 3, a reading section 4, a reproducing section 5, an OSD (On Screen Display) image storage section 6, an image synthesizing section 7, a sound output section 8, and an image output section 9. The section 2 has overall control over operation of the apparatus 1. When an optical disc 10 is inserted into a slot 3A, the section 3 delivers the disc 10 to a set position where the disc 10 is mounted on a turntable (not shown). The section 4 reads data of contents, such as programs, stored on the disc 10. Based on the read data, the section 5 reproduces images and sounds of the contents. The section 6 stores therein OSD images. The section 7 superimposes an OSD image on an image reproduced by the section 5, in order to produce and output a composite image. The section 8 has a speaker 8A for outputting a sound reproduced by the section 5. The section 9 has a display 9A to display thereon a composite image produced by the section 7. Referring to FIG. 2, the slot 3A is provided horizontally on a top rear surface of the display 9A. An optical disc 10 is inserted from above into the slot 3A with a recorded surface facing frontward, i.e., in front orientation.

The section 3 has two sensors, a disc-in sensor and a disc-out sensor. Provided for detecting presence or absence of optical disc 10, the two sensors are aligned with each other along a direction in which an optical disc 10 is inserted. Of the two sensors, the disc-in sensor is located nearer to the slot 3A. With both of the disc-in sensor and the disc-out sensor in off state where the sensors detect absence of optical disc 10, the apparatus 1 determines that an optical disc 10 is not loaded therein. When the disc-in sensor shifts from the off state to on state with the disc-out sensor in off state, the apparatus 1 determines that an optical disc 10 is inserted in the slot 3A. The section 3 holds the inserted disc 10 and delivers the disc 10 to a set position where the disc 10 is to be mounted on a turntable. In the set position, the entire disc 10 is in the apparatus 1 with both of the disc-in sensor and the disc-out sensor in on state. The section 3 also performs an eject operation of delivering the disc 10 from the set position to the slot 3A and ejecting the disc 10. In the eject operation, the section 3 delivers the disc 10 to a position where the disc-out sensor is turned off. At the time, part of the disc 10 projects upward from the slot 3A with the disc-in sensor still in on state. A user holds the projected part of the disc 10 and removes the disc 10 from the apparatus 1. Upon removal of the disc 10, the disc-in sensor is turned off.

If the disc 10 is not removed from the apparatus 1 (i.e., the disc-in sensor is not turned off) after the eject operation and the disc 10 is then pushed into the apparatus 1 to turn on the disc-out sensor, the apparatus 1 determines that the disc 10 is inserted in the apparatus 1.

The section 4 has a known pick-up assembly. The section 4 reads data of the contents recorded on the disc 10 by irradiating, with a laser beam, the disc 10 that is mounted on the turntable and being spun and by detecting a reflected light. The section 5 separates the read data into image data and sound data, decodes the image and sound data, and reproduces images and sounds. The section 6 stores therein a guide image for indicating a proper orientation of insertion of the disc 10 into the slot 3A (hereinafter merely as the proper insertion orientation). The section 7 superimposes an OSD image read out from the section 6 on an image reproduced by the section 5, in order to produce and output a composite image. Depending on the situation, the section 7 can output only either one of the OSD image and the reproduced image as a composite image. The section 8 inputs, to the speaker 8A, a sound signal according to a sound reproduced by the section 5, so that the reproduced sound is output from the speaker 8A. The section 9 inputs, to the display 9A, an image signal according to a composite image output by the section 7, so that the composite image is displayed on the display 9A.

The section 2 stores therein a guide flag for indicating estimated likelihood of optical disc 10 being inserted into the apparatus 1 with the recorded surface facing rearward (i.e., in reverse orientation), that is, estimated likelihood of reverse insertion. In the present embodiment, the guide flag is set on when the estimated likelihood is high, whereas the guide flag is set off when the estimated likelihood is low. Also, the section 2 stores therein a history of data on orientations of optical discs loaded in the apparatus 1. Each time an optical disc 10 is loaded, a set of data on orientation of the loaded disc 10 (hereinafter merely as orientation data) is recorded in the history. The history contains, for example, ten sets of orientation data corresponding to ten recent disc insertions. When an optical disc 10 is delivered to the set position by the loading section 3, more specifically, the section 2 determines whether the disc 10 is in proper orientation or in reverse orientation. Then, the section 2 records the determination result as a set of orientation data. At the same time, an eleventh previous set of orientation data is deleted from the history.

As described earlier, the guide flag is set on when the estimated likelihood is high, whereas the guide flag is set off when the estimated likelihood is low. In the present embodiment, the guide flag is turned on when there occur a first number of reverse insertions, for example three reverse insertions, out of ten recent disc insertions. In other words, the guide flag is turned on when there is a high frequency of occurrence of reverse insertion. Meanwhile, the guide flag is turned off when there occur a second number of successive proper insertions, for example five successive proper insertions. In other words, the guide flag is turned off when there is a high frequency of occurrence of proper insertion. The first number corresponds to the first condition of the invention, whereas the second number corresponds to the second condition of the invention.

It is to be noted that the guide flag is held in existing state if both of the first and second conditions are not satisfied.

Figure 3:
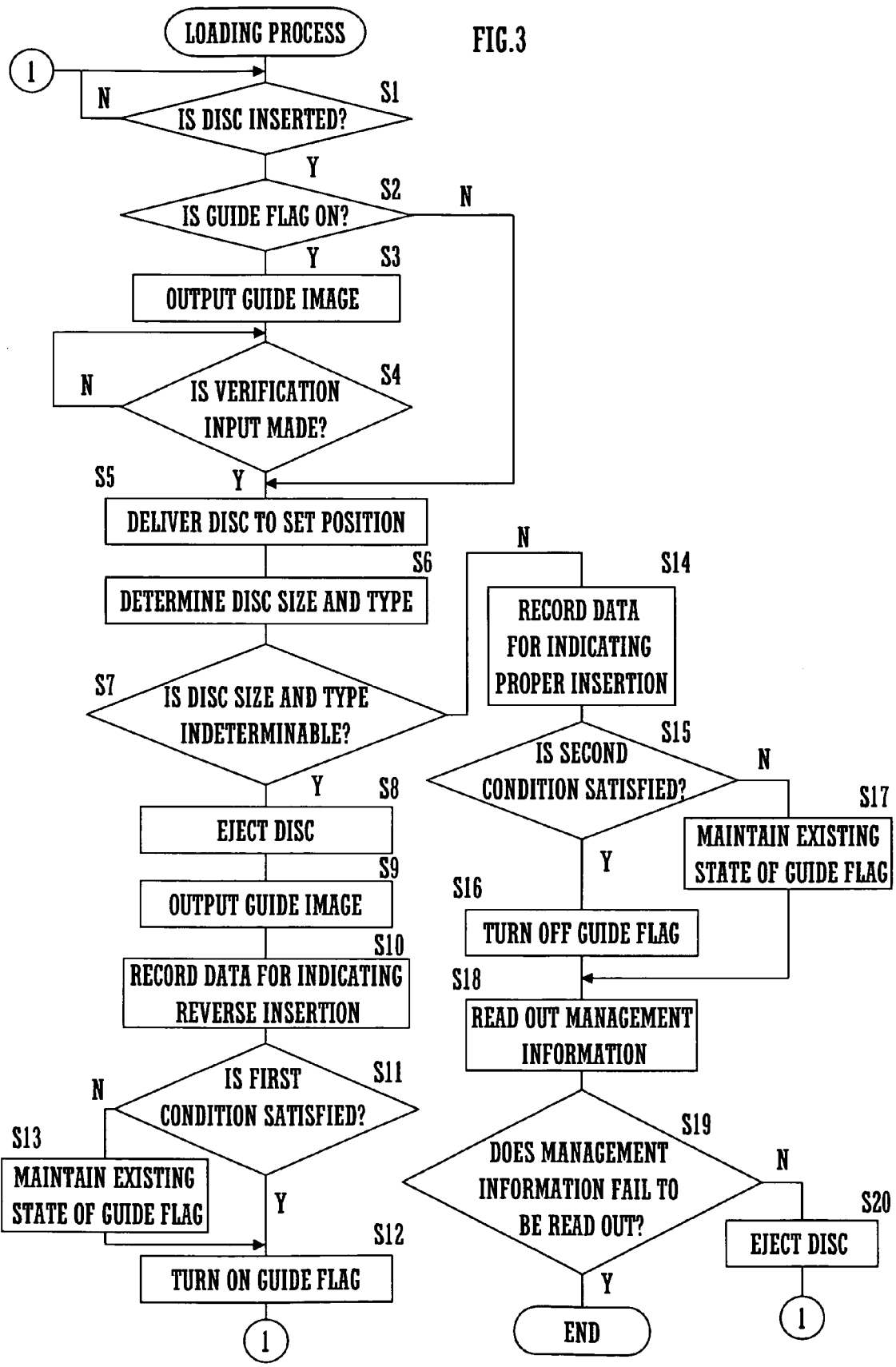
FIG. 3 is a flowchart illustrating steps of a loading process performed in the apparatus.

The apparatus 1 performs a loading process as described below. FIG. 3 is a flowchart illustrating steps of the loading process. The apparatus 1 waits for an optical disc 10 to be inserted into the slot 3A (S1). More specifically, the apparatus 1 waits for the disc-in sensor to be turned on upon detection of the disc 10. When determining in step S1 that the disc 10 is inserted in the slot 3A, the apparatus 1 further determines whether the guide flag stored in the section 2 is on or off (S2).

Figure 4:
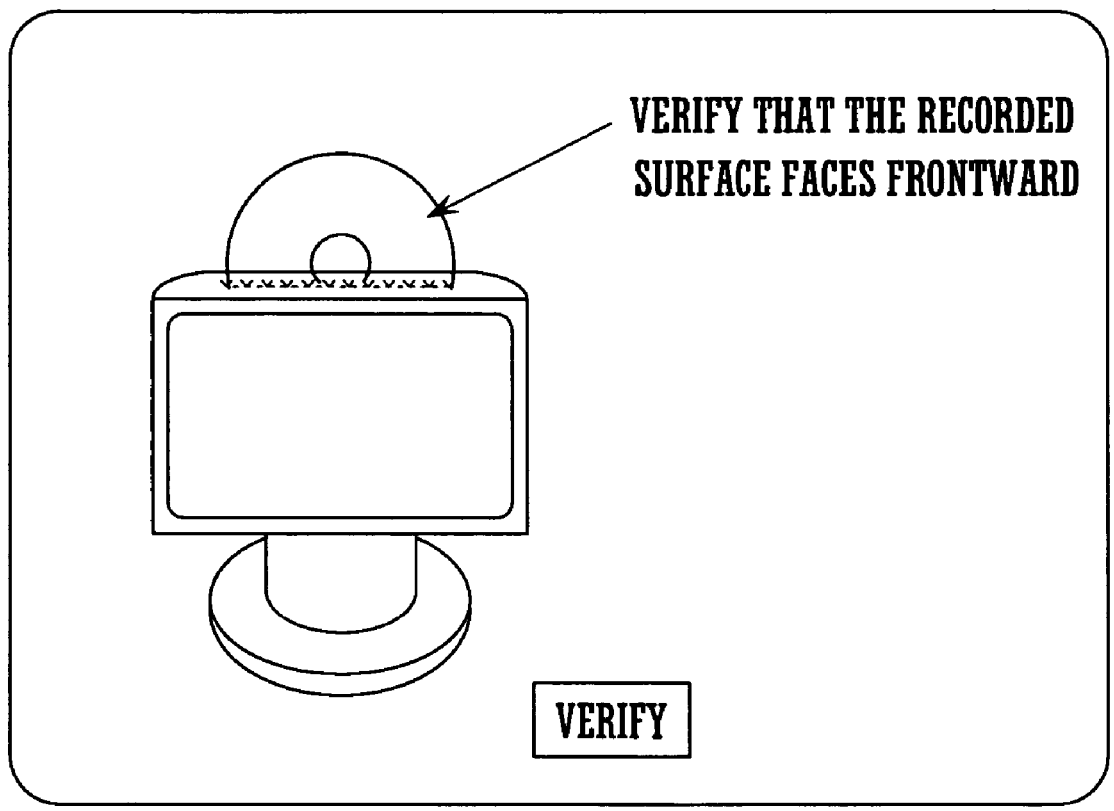
FIG. 4 is a diagram for illustrating a guide image displayed by the apparatus.

When determining in step S2 that the guide flag is on, i.e., that there is a high likelihood of reverse insertion, the apparatus 1 prevents the section 3 from delivering the disc 10 to the set position, i.e., from initiating a loading action. Instead, the apparatus 1 performs a guide-image output process in which the apparatus 1 reads out the guide image, stored in the section 6, for indicating the proper insertion orientation, and displays the guide image on the display 9A (S3). In step S3, the section 7 outputs the guide image as a composite image. The guide image, as shown in FIG. 4, is displayed in order to urge a user to insert the disc 10 with the recorded surface facing frontward (i.e., in an identical orientation to that indicated on the display 9A). The guide image may be a still image, or a moving image of about two or three second length. After outputting the guide image in step S3, the apparatus 1 waits for a verification input, i.e., an input for verifying that the disc 10 is inserted in the slot 3A in proper orientation (S4).

At this time, the disc 10 is inserted in the slot 3A, but not yet loaded inside the apparatus 1 by the section 3. When viewing the displayed guide image to realize that the user has inserted the disc 10 in reverse orientation, the user quickly removes the disc 10 from the slot 3A and inserts the disc 10 again into the slot 3A in proper orientation. When verifying that the disc 10 is inserted in proper orientation, the user makes a verification input into the apparatus 1 through a operating section or a remote control (not shown).

When determining in step S4 that the verification input is made, the apparatus 1 allows the section 3 to deliver the inserted disc 10 to the set position (S5). Meanwhile, when determining in step S2 that the guide flag is off, the apparatus 1 skips the steps S3 and S4 and allows the section 3 to deliver the inserted disc 10 to the set position (S5).

The apparatus 1 then mounts the disc 10 on the turntable and determines size and type of the disc 10 (S6). When determining in step S7 that the size and type of the disc 10 both cannot be determined, the apparatus 1 determines that the disc 10 is inserted in reverse orientation, and ejects the disc 10 (S8). Also, the apparatus 1 performs a guide-image output process (S9). This process is similar to that as performed in step S3.

Further, the apparatus 1 allows the section 2 to record, in the history, data for indicating that the disc 10 is inserted in reverse orientation (S10). Then the apparatus 1 determines whether the first condition is satisfied (S11). When determining in step S11 that the first condition is satisfied, the apparatus 1 allows the guide flag to be set on (S12) and then returns to step S1. Conversely, when determining that the first condition is not satisfied, the apparatus 1 maintains an existing state of the guide flag (S13) and returns to step S1.

It is to be noted that, depending on the situation, the guide flag that is already on may be turned on again in step S12, without causing any problem.

Meanwhile, when determining in step S7 that the size and type of the disc 10 both have been determined, the apparatus 1 determines that the disc 10 is inserted in front orientation, and records, in the history, data for indicating that the disc 10 is inserted in proper orientation (S14). Then, the apparatus 1 determines whether the second condition is satisfied (S15). When determining in step S15 that the second condition is satisfied, the apparatus 1 turns off the guide flag (S16). Conversely, when determining that the second condition is not satisfied, the apparatus 1 maintains an existing state of the guide flag (S17).

It is to be noted that, depending on the situation, the guide flag that is already off may be set off again in step S16, without causing any problem.

After completing the step S16 or S17, the apparatus 1 reads out management information, such as a TOC (Table of Contents), stored in a lead-in area of the disc 10 (S18). When the apparatus 1 fails to read out the management information in step S18, the apparatus 1 determines that the disc 10 is faulty (S19), and ejects the disc 10 (S20). In step S20, the apparatus 1 ejects the disc 10 not because the disc 10 is inserted in reverse orientation, but because the disc 10 is unreadable due to a scratch or the like thereon. Meanwhile, when the apparatus 1 succeeds in reading out the management information in step S18, the apparatus 1 waits for an input for reproducing the contents recorded on the disc 10 and, upon receipt of such input, reproduces the contents.

When there is a high likelihood that an optical disc 10 is inserted in reverse orientation, i.e., when reverse insertion has occurred at a predetermined level of frequency, as thus far described, the apparatus 1 outputs the guide image upon insertion of an optical disc 10 into the slot 3A, thereby showing a user the proper orientation of optical disc 10. Thus, the apparatus 1 ensures that the user recognizes the proper orientation of optical disc 10. While outputting the guide image, the apparatus 1 temporarily prevents the loading section 3 from loading an optical disc 10 into the apparatus 1. When noticing that a user has inserted the disc 10 in reverse orientation, thus, the user can bring the disc 10 in proper orientation immediately. Even if an optical disc 10 is loaded in reverse orientation inside the apparatus 1, the apparatus 1 also outputs the guide image, thereby allowing a user to recognize the proper orientation of disc 10 who happens to insert the disc 10 in reverse orientation. Also, when there is a low likelihood that an optical disc 10 is inserted in reverse orientation, the apparatus 1 allows the section 3 to load the disc 10 thereinto immediately upon insertion of the disc 10 into the slot 3A. This arrangement saves a user that is aware of the proper orientation of disc 10 from feeling inconvenience.

In the embodiment as described above, the slot 3A is provided horizontally on a top rear surface of the display 9A. Alternatively, the slot 3A may be provided on a left or right side surface of the display 9A. Also, the invention is applicable to a slot-loading optical disc apparatus without a display.

In the foregoing embodiment, the apparatus 1 is configured to determine whether to prevent the loading section 3 from loading the disc 10 inserted in the slot 3A into the apparatus 1, according to on-off state of the guide flag. Alternatively, the apparatus 1 may be configured to display the guide image whenever an AC power cord is connected to the apparatus 1. This configuration causes a new user to view the guide image before use of the apparatus 1, thereby ensuring that the user recognizes the proper insertion orientation of optical disc 10.

Alternatively, the apparatus 1 may be configured to display the guide image on receipt of a specified input. This configuration allows a user to verify an insertion orientation of optical disc 10, whenever the user wants to, by entering the specified input.

It is to be noted that the invention is applicable not only to a reproducing optical disc apparatus such as discribed in the foregoing embodiment, but also to a recording optical disc apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc apparatus, comprising:
   a loading means for loading an optical disc inserted in a slot into a main body;
   a reproducing means for reading and reproducing data stored on an optical disc loaded in the main body;
   a guide image outputting means for outputting a guide image that indicates a proper orientation in which an optical disc is to be inserted into the slot;
   a determining means for determining, each time the loading means loads, when the loading means loads an optical disc inserted in the slot into the main body, whether the optical disc is in proper orientation or in reverse orientation and for counting a first number of reverse insertions and a second number of proper insertions;
   a storage means for storing a guide flag, the guide flag being turned on when the first number of reverse insertions satisfies a first condition, the guide flag being turned off when the second number of proper insertions satisfies a second condition; and
   a verification requesting means for instructing the guide image outputting means to output the guide image, while temporarily preventing the loading means from loading an optical disc into the main body, if the guide flag is on when the optical disc is inserted in the slot.

2. The optical disc apparatus according to claim 1,
   wherein, after instructing the guide image outputting means to output the guide image, the verification requesting means allows the loading means to load an optical disc inserted the slot into the main body, upon receipt of an input for verifying that the optical disc is inserted in proper orientation.

3. The optical disc apparatus according to claim 2,
   wherein the verification requesting means instructs the guide image outputting means to output the guide image when the determining means determines that an optical disc loaded in the main body is in reverse orientation.

4. The optical disc apparatus according to claim 2,
   wherein the verification requesting means instructs the guide image outputting means to output the guide image for a predetermined time regardless of whether the guide flag is on or off.

* * * * *